Figure 1:
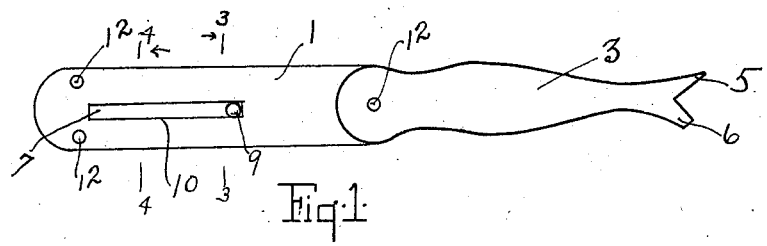

No. 847,031. PATENTED MAR. 12, 1907.
A. L. TOLMAN.
MANICURE IMPLEMENT.
APPLICATION FILED JAN. 25, 1906.

Abraham Lincoln Tolman, Inventor

Witnesses
by Ellis Spear Jr.
Attorney

UNITED STATES PATENT OFFICE.

ABRAHAM LINCOLN TOLMAN, OF ORANGE, MASSACHUSETTS.

MANICURE IMPLEMENT.

No. 847,031.     Specification of Letters Patent.     Patented March 12, 1907.

Application filed January 25, 1906. Serial No. 297,735.

*To all whom it may concern:*

Be it known that I, ABRAHAM LINCOLN TOLMAN, a citizen of the United States, residing at Orange, in the county of Franklin and Commonwealth of Massachusetts, have invented certain new and useful Improvements in Manicure Implements, of which the following is a specification.

The present invention involves certain improvements in tweezers of the type commonly used for the extraction of splinters and other general personal use, and has for its object the provision of certain features which will allow a more extended use of the same and also for a certain arrangement and combination of parts which will make such a structure adaptable to the uses required.

The details of this structure will be more fully set forth in the specification which follows and shown in the drawings, which form a part thereof, and in which—

Figure 2:
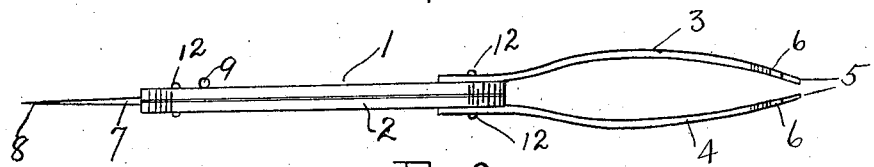
Figure 3:
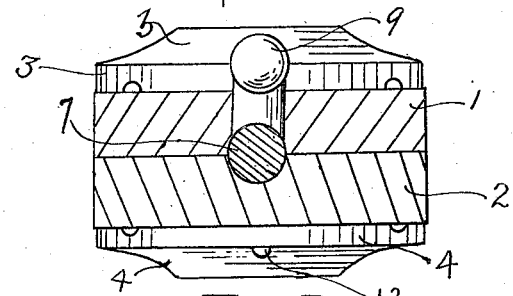
Figure 4:
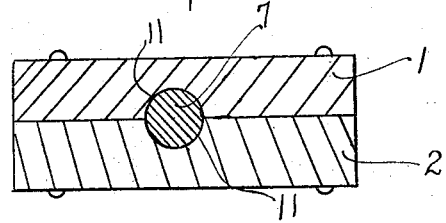

Figure 1 is a plan view of my tweezer with needle withdrawn; Fig. 2, a side view with needle extended; Fig. 3, a section on the line 3 3, Fig. 1; and Fig. 4, a section on the line 4 4, Fig. 1.

1 and 2 are handle members terminating in spring-fingers 3 and 4, each of which has at its end forked points 5 and 6. The point 5 is sharp, while 6 is a broader projection located close to the same. The fingers 3 are slightly bent to allow 5 and 6 to contact on their edges and be held under a spring-pressure in their closed position. Normally they stand apart, as shown in Fig. 3.

Between the plates 2 and 1 of the handle is located a needle 7, having a point 8 and a knob 9 formed on its opposite end, which is turned up and headed for that purpose. The knob 9 projects through a slot 10 in the plate 2 and slides in the same to move the needle out of the handle into operative position.

11 are grooves in the plates 1 and 2 to receive and guide the needle 7 and allow the plates to fit closely together at their edges. The plates are united by rivets 12 to hold together the two parts of the instrument and to secure the needle against displacement.

In use the fingers 3 and 4 are pressed together between thumb and forefinger as is usual with instruments of this type. The needle 7 is easily controlled by the knob 9 to withdraw the point within the handle or to push the same out in a position for use.

The spring-fingers 3 and 4 are attached to the handle members 1 and 2 and pivoted thereon by the rivet 12 at that end. This pivoting of the fingers allows them to be folded or swung around upon the handle, which they inclose and cover, thus making a neat and compact article.

The slight bend of the fingers allows them to inclose the knob 9 of the needle 7 and guard against the unintentional uncovering of the point while in the pocket.

What I therefore claim, and desire to secure by Letters Patent, is—

1. The herein-described implement consisting of the combination of a pair of plates provided at one end with spring-fingers terminating in tweezer-points and at the other end formed with a centrally-located groove between said plates, a rivet on each side of said groove for holding the plates in contact, a slot in one plate communicating with said groove and a needle in said groove having its inner end upturned through said slot.

2. The herein-described implement consisting of the combination of a pair of plates provided at one end with swinging tweezer-fingers pivoted thereto, a slot in one of said plates and a needle slidably held between said plates and having the end thereof upturned through said slot, whereby said tweezer-fingers when swung over said plates will cover said upturned needle end.

In testimony whereof I affix my signature in presence of two witnesses.

ABRAHAM LINCOLN TOLMAN.

Witnesses:
    GEORGE EARL HASTINGS,
    GEORGE C. FENTON.